J. J. LAHAYE & J. M. LYONS.

Improvement in Cigar Moulds.

No. 122,034.  Patented Dec. 19, 1871.

Witnesses:
Wm. A. Steel
John Parker

J. J. Lahaye
and
J. M. Lyons
by their Attn.
Hirosen and Son

AM. PHOTO-LITHOGRAPHIC CO. N.Y. (OSBORNE'S PROCESS.)

125,034

UNITED STATES PATENT OFFICE.

JOHN JAMES LAHAYE AND JAMES M. LYONS, OF READING, PENNSYLVANIA.

IMPROVEMENT IN CIGAR-MOLDS.

Specification forming part of Letters Patent No. 122,034, dated December 19, 1871.

*To all whom it may concern:*

Be it known that we, JOHN JAMES LAHAYE and JAMES M. LYONS, of Reading, in the county of Berks and State of Pennsylvania, have invented an Improved Cigar-Mold, of which the following is a specification:

Our invention consists of a cigar-mold composed of two longitudinally-recessed jaws, hinged together at one end, and of a curved knife, forming part of or secured to the outer end of one of the said jaws, and arranged to overlap the other, all as fully described hereafter; and our invention also consists of a compound mold, similar to the above, except that a number of recesses are formed in the hinge-jaws or plates so as to form a corresponding number of molds. The principal objects of our invention are to enable molded cigars to be produced without the usual objectionable ridge upon each side at the points where the jaws come together, to reduce the cost of the mold and the labor of molding, and to dispense with the retainers commonly used in connection with ordinary cigar-molds for holding the cigars after the molding and during the drying process.

Figure 1:
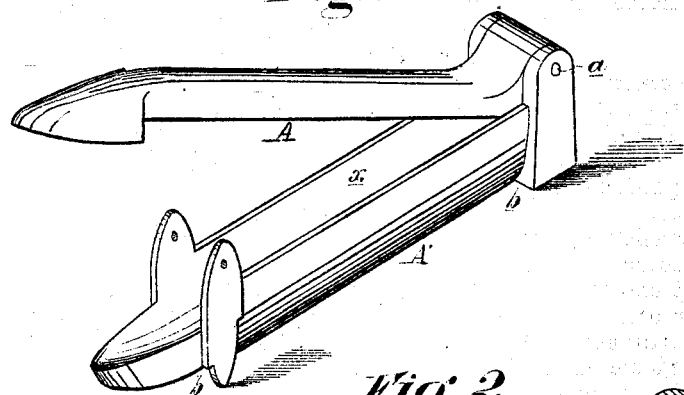
Figure 2:
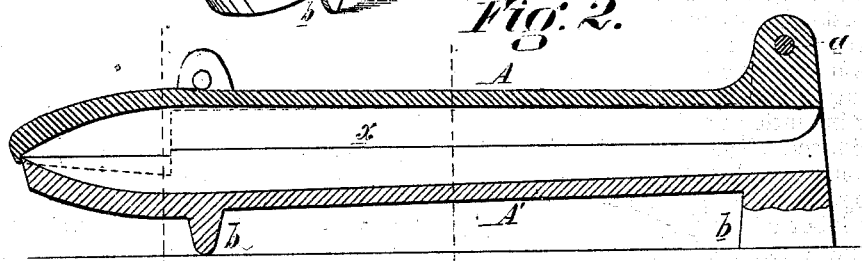
Figure 3:
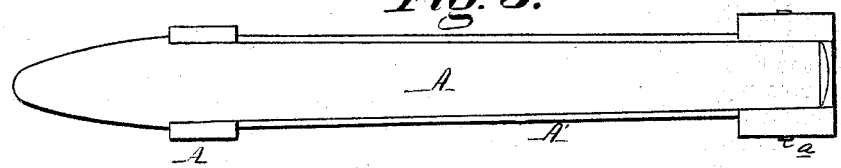
Figure 5:
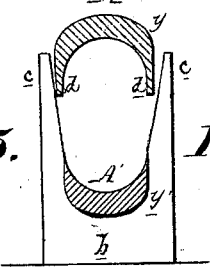
Figure 4:
Figure 6:
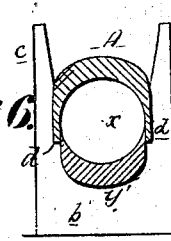

In the drawing, Figure 1 is a perspective view of our improved cigar-mold, showing the jaws opened; Fig. 2, a longitudinal section with the jaws closed; Fig. 3, a plan view; Fig. 4, a transverse section on the line 1 2, Fig. 2; Figs. 5 and 6, transverse sections on the line 3 4, Fig. 2, illustrating the operation of cutting and shaping the tapering or butt end of the cigar; and Fig. 7, a view of a compound mold constructed in accordance with our invention.

The mold consists mainly of two jaws, A and A', hinged together at one end by a pin, $a$, so that they may be opened and closed in the manner illustrated in Fig. 1; and the lower jaw A', which forms a base for the mold, may either be cast solid at the bottom or be provided with feet $b\ b$, as shown in the drawing. The mold proper is formed partly in one jaw and partly in the other, both of said jaws being recessed longitudinally throughout their entire length, so that when closed, as shown in Fig. 2, there may be formed between them a space, $x$, of the exact shape of a cigar, the said space being rounded to a point at the outer ends of the jaws so as to correspond in shape to the tapering or butt end of a cigar, and being open at the opposite end, as plainly shown in the drawing. Two lugs, $c\ c$, inclined or beveled on their inner edges, as shown in Figs. 5 and 6, are formed upon opposite sides of the lower jaw A' of the mold, close to the outer end of the latter, and serve the double purpose of guiding the upper jaw in closing the mold, and of facilitating the opening of the latter, as hereinafter described. The lower jaw A', between the hinge and the lugs $c$, is deeper than the jaw A, and overlaps the latter when the mold is closed, as shown in Fig. 4; but between the lugs $c$ and its extreme outer end the said jaw A' is the shallowest, and is overlapped by a curved lip or knife, $d$, secured to or forming part of the upper jaw, as best observed in Figs. 2, 5, and 6. The shallow and overlapped portions $y$ and $y'$ of the upper and lower jaws are reduced to sharp edges upon both sides, as plainly shown in Figs. 4, 5, and 6, so that when the mold is closed it shall have a circular cross-section, unbroken by projections or shoulders at the points where the jaws join or overlap each other.

In using the mold the jaws are opened, as shown in Fig. 1, and a bunch of fillers, made up in the usual manner to form the body of a cigar, is placed in the concavity of the lower jaw A', care being taken that the end or ragged portion of the end of the bunch projects slightly beyond the outer extremity of the jaw. The upper jaw is then closed, and is struck smartly, so that its lip or knife $d$, which overlaps and fits accurately to the edge of the jaw A', may shear off the projecting portions of the bunch and thus form the desired taper at the end of the same. The bunch is also compressed and rounded by the pressure of the jaws to the exact shape desired, and, owing to the manner in which the jaws overlap each other and fit together, will be free from any rib, fin, or flange at the joints where the jaws came together, but will have a perfectly smooth exterior, and be ready for the wrapper when removed from the mold. Inasmuch as the upper jaw fits into the lower for a part of its length, and over the same for the remaining portion, the jaws will bind together when closed, and will retain their position, compressing the tobacco without the necessity of any tightening or retaining device. The cigar, when thus cut and compressed to the required shape, is left in the mold to dry, the jaws being, if necessary, prevented from opening by a rod passed through holes $e\ e$ in the lug $c$, and across the top of the jaw A; but this will in most cases be found unnecessary, as the friction between the overlapping portions of the mold will generally be sufficient to prevent the accidental opening of the jaws. When the cigar has become sufficiently dried in the mold, thus used as a retainer, it can be readily removed by inverting the mold and striking the projecting ends of the lugs $c$ against a table or other object, which will have the effect of opening the jaws and of leaving the cigar within the shallow portion $y$ of the jaw A, from which it can be easily lifted. Ordinary cigar-molds, formed with operating-levers, cutting-knives, &c., are of too expensive and cumbersome a character to be used for holding the cigars during the drying of the latter. A number of separate retainers has consequently to be provided for each mold, and each cigar, as it is cut and shaped, has to be removed from the latter and transferred to a retainer to dry. This handling and moving occupies considerable time, and the molded filler is frequently bent out of shape or injured. These objections, it will be evident, are entirely overcome by the use of our improved mold, which can be produced almost as cheaply as an ordinary drying-retainer, and can therefore be used for all the purposes of the latter, as well as for a mold and cutter. It is also much cheaper than an ordinary shaping-mold, even if used as a mold only; and has the advantages of being easily and quickly manipulated, and of producing cigars of a uniform and proper shape, and free from ridges where the jaws lap over or come together.

Figure 7:
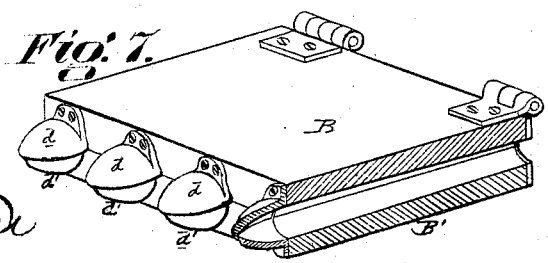

In the modification of our invention, shown in Fig. 7, a compound mold is formed by hinging two wide plates, B and B', together on one edge, in the same manner as the jaws. A number of parallel and coinciding recesses in these plates forms, when the latter are closed, molds similar to those of the jaws. The overlapping lips or cutters $d$ are secured to and project from the upper plate B, and fit accurately over similar projecting portions $d'$ of the under plate, and all of the molds can be opened and closed simultaneously by raising and lowering the upper plate.

We claim as our invention—

1. A combined mold, cutter, and drying retainer for cigars, consisting of two-hinged and overlapping jaws, A and A', substantially as described.

2. The combination of the jaw A' and the jaw A, fitting for a part of its length within the jaw A, and having at its outer end an overlapping lip or knife $d$, as set forth.

3. The combination, substantially as described, of the jaw A with the lugs $c\ c$ of the jaw A'.

In testimony whereof we have signed our names to this specification in the presence of two subscribing witnesses.

JOHN JAS. LAHAYE.
JAMES M. LYONS.

Witnesses:
GEORGE W. HUNTER,
R. K. BARRETT.                           (160)